_(12)_ United States Patent
Baker et al.

(10) Patent No.: US 12,000,346 B2
(45) Date of Patent: Jun. 4, 2024

(54) REDUNDANT ELECTRO-HYDRAULIC SERVO VALVE (EHSV) CONTROL IN A FUEL METERING SYSTEM

(71) Applicant: Woodward, Inc., Fort Collins, CO (US)

(72) Inventors: Carthel C. Baker, Daytona Beach, FL (US); Andrew D. Splitt, Loves Park, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/340,508

(22) Filed: Jun. 23, 2023

(65) Prior Publication Data

US 2023/0417193 A1    Dec. 28, 2023

Related U.S. Application Data

(60) Provisional application No. 63/355,841, filed on Jun. 27, 2022.

(51) Int. Cl.
| | |
|---|---|
| *F02C 9/26* | (2006.01) |
| *F02C 7/232* | (2006.01) |
| *F02C 9/46* | (2006.01) |
| *F23R 3/34* | (2006.01) |

(52) U.S. Cl.
CPC .............. *F02C 9/263* (2013.01); *F02C 7/232* (2013.01); *F02C 9/46* (2013.01); *F05D 2260/84* (2013.01); *F23R 3/346* (2013.01)

(58) Field of Classification Search
CPC .... F02C 9/263; F02C 9/34; F02C 9/46; F02C 7/232; F02C 7/228; F02C 7/22; F23R 3/34; F23R 3/346; F23R 2900/03341; F15B 20/008; F15B 2211/8757; F15B 2211/8752; F05D 2260/84
See application file for complete search history.

(56) References Cited

U.S. PATENT DOCUMENTS

| | | | |
|---|---|---|---|
| 2,767,689 A | 10/1956 | Moog, Jr. | |
| 6,637,199 B2 * | 10/2003 | Spickard | ................. F02C 9/285 91/509 |
| 7,096,658 B2 | 8/2006 | Wernberg et al. | |
| 7,185,485 B2 | 3/2007 | Lewis | |
| 7,587,900 B2 | 9/2009 | Shelby et al. | |

(Continued)

FOREIGN PATENT DOCUMENTS

| | | | |
|---|---|---|---|
| FR | 3095840 A1 * | 11/2020 | ............. F02C 7/232 |
| GB | 2521508 A | 6/2015 | |

*Primary Examiner* — Alain Chau
(74) *Attorney, Agent, or Firm* — Reinhart Boerner Van Deuren P.C.

(57) ABSTRACT

A redundant fuel metering system and method for a multi-stage combustor that utilizes a fuel metering valve EHSV from a less critical combustor stage fuel metering system as a redundant backup to the main metering valve EHSV. In the event of a failure of the main FMV EHSV, a control module signals a transfer system to switch control of the main FMV to the less critical combustor stage fuel metering system EHSV, thus maintaining control of the FMV for the main combustor. In doing this, the transfer valve then drives the less critical combustor stage fuel metering system FMV to its failsafe position while maintaining control of the main system.

18 Claims, 6 Drawing Sheets

(56) References Cited

U.S. PATENT DOCUMENTS

| | | | | |
|---|---|---|---|---|
| 8,224,552 | B2* | 7/2012 | Van Vactor | F02C 9/46 60/773 |
| 10,968,836 | B2* | 4/2021 | Price | F02C 9/26 |
| 11,788,476 | B1* | 10/2023 | Rowan | F02C 9/263 60/39.281 |
| 2003/0140625 | A1* | 7/2003 | Spickard | F02C 9/285 60/403 |
| 2007/0234732 | A1* | 10/2007 | Shelby | F02C 7/232 60/734 |
| 2007/0277670 | A1* | 12/2007 | Spickard | F15B 20/002 91/392 |
| 2010/0005657 | A1* | 1/2010 | Van Vactor | F01D 21/02 29/889.2 |
| 2010/0010720 | A1* | 1/2010 | Van Vactor | F01D 21/02 701/100 |
| 2010/0010721 | A1* | 1/2010 | Van Vactor | F02C 9/46 60/773 |
| 2018/0135529 | A1 | 5/2018 | Portolese et al. | |
| 2023/0265937 | A1* | 8/2023 | O'Rorke | F16K 31/0606 415/148 |
| 2023/0294835 | A1* | 9/2023 | Susca | B64D 31/02 91/508 |

\* cited by examiner

REDUNDANT ELECTRO-HYDRAULIC SERVO VALVE (EHSV) CONTROL IN A FUEL METERING SYSTEM

CROSS-REFERENCE TO RELATED PATENT APPLICATIONS

This patent application claims the benefit of U.S. Provisional Patent Application No. 63/355,841, filed Jun. 27, 2022, the entire teachings and disclosure of which are incorporated herein by reference thereto.

FIELD OF THE INVENTION

This invention generally relates to multi-stage gas turbine fuel systems and more particularly to multi-stage gas turbine fuel systems that require redundant control of a fuel metering unit to ensure continued primary combustor operation in the event of primary fuel control failure.

BACKGROUND OF THE INVENTION

A typical multi-stage gas turbine fuel system, such as that described in U.S. Pat. No. 7,096,658 to Wernberg et al., entitled Centrifugal Pump Fuel System and Method for Gas Turbine Engine (hereinafter the "'658 Patent"), and assigned to the assignee of the present application, the teachings and disclosure of which are incorporated herein in their entireties by reference thereto, utilizes a single Fuel Metering Unit (FMU) to meter fuel flow downstream to the main combustor stage as needed, e.g., to power an aircraft. The FMU typically includes a single prime reliable fuel metering valve (FMV). This FMV may include a dual channel linear variable displacement transducer (LVDT) to provide feedback of the fuel metering valve position. The Electronic Engine Controller (EEC) uses the position of the FMV to regulate the metered fuel flow. The EEC positions the FMV by supplying an electrical signal to the Electro-Hydraulic Servo Valve (EHSV) that provide the hydraulic muscle to adjust the FMV to the desired position.

Figure 1:
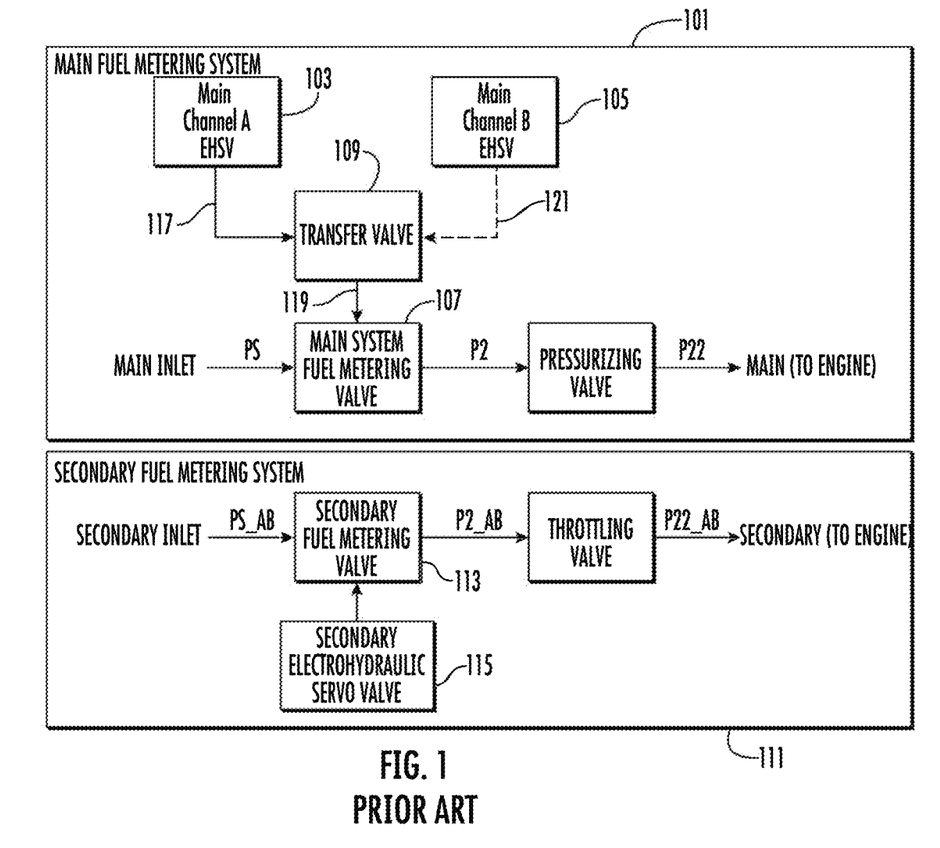
FIG. 1 is a simplified block diagram of a prior art fuel metering system for a multi-stage combustor having redundant fuel metering control for the primary stage combustor illustrating normal, non-fault operation.

In order to increase the redundancy of the fuel control for applications such as that described in the '658 Patent, and in view of the increasing criticality of the main combustor stage in such and other applications, main fuel metering systems 101 utilize redundant EHSVs 103,105 for control of the FMV 107 of the FMU as shown in FIG. 1. In order to provide such redundancy, a transfer system including a transfer valve 109 is included to allow the EEC to select which of the two redundant EHSVs 103, 105 to use to control the FMV 107. In the event of a failure of the controlling EHSV 103, the EEC can signal the transfer system to switch control via the transfer valve 107 to the second EHSV 105, thus maintaining control of the FMV 107.

As described in the '658 Patent, such multi-stage systems also include additional combustor stages, each of which include a similar fuel control system 111. In the exemplary embodiment described in the '658 Patent, such additional combustor stages may include afterburner zones, each of which utilizes an afterburner or secondary fuel control system 111 to provide metered flow to each secondary zone. While only a single additional, secondary stage fuel control system 111 is shown in FIG. 1, additional secondary combustor stages may utilize additional fuel control systems.

This secondary fuel metering system 111 includes a single FMV 113 and a dual channel LVDT to provide feedback of the FMV position. The EEC uses the position of the FMV 113 to regulate metered fuel flow to each secondary zone. As with the primary combustor stage fuel control 101, the EEC positions each FMV 113 by supplying an electrical signal to an EHSV 115 that provides the hydraulic muscle to adjust the FMV 113 to the desired position. Unlike the main combustor stage which has evolved to include redundant EHSV control, these additional combustor stages are typically not as critical, and therefore typically do not justify the increased cost and weight of such redundant control components.

Figure 2:
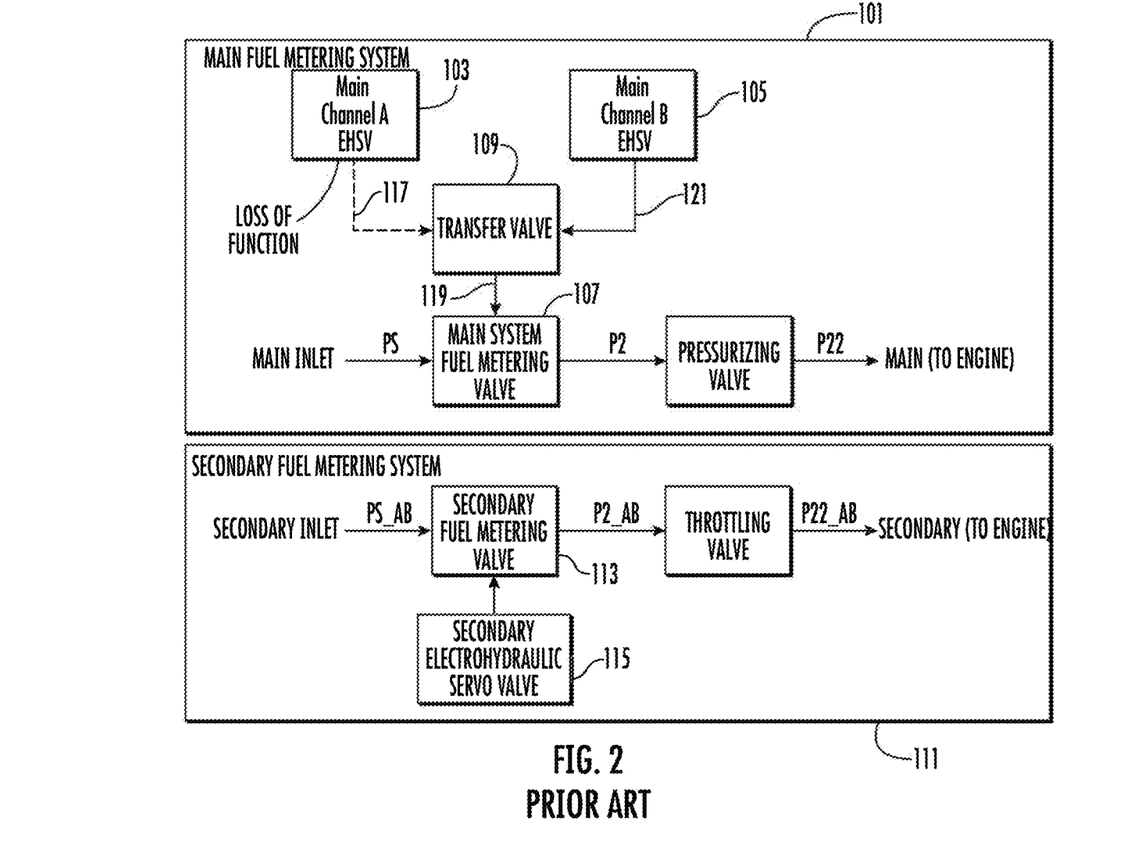
FIG. 2 is a simplified block diagram of the prior art fuel metering system for the multi-stage combustor having redundant fuel metering control for the primary stage combustor of FIG. 1 illustrating redundant fuel metering operation of the primary stage combustor during a failure of the primary FMV control.

While FIG. 1 illustrates the normal operating mode of this prior fuel metering system with the redundant EHSVs 103, 105, FIG. 2 illustrates the operation in the event of a failure of the controlling EHSV 103. In FIG. 1 the transfer system, which utilizes a transfer valve 109 (see also FIG. 5), is positioned such that the control pressures from the main channel A EHSV 103 are supplied via the solid line 117, 119 to position the main FMV 107. The control pressures from the main channel B EHSV 105 shown as the dashed line 121 are blocked from the main FMV 107 at the transfer valve 109. Control of the additional combustor stage metering system EHSV 115 is not linked to the main metering system even though it is in a parallel fluid circuit (or separate fluid circuit in some embodiments).

In FIG. 2 the transfer system is positioned such that the control pressures from the main channel B EHSV 105 are supplied via the solid line 121, 119 to position the main FMV 107. The control pressures from the main channel A EHSV 103 now shown as the dashed line 117 are blocked from the main FMV 107 at the transfer valve 109. This switching of the controlling EHSV represents a failure of the main channel A EHSV 103. Control of the secondary metering system EHSV 115 is not linked to the main metering system and is therefore unaffected by the failure and switching of the metering control in the main combustor stage.

Figure 5:
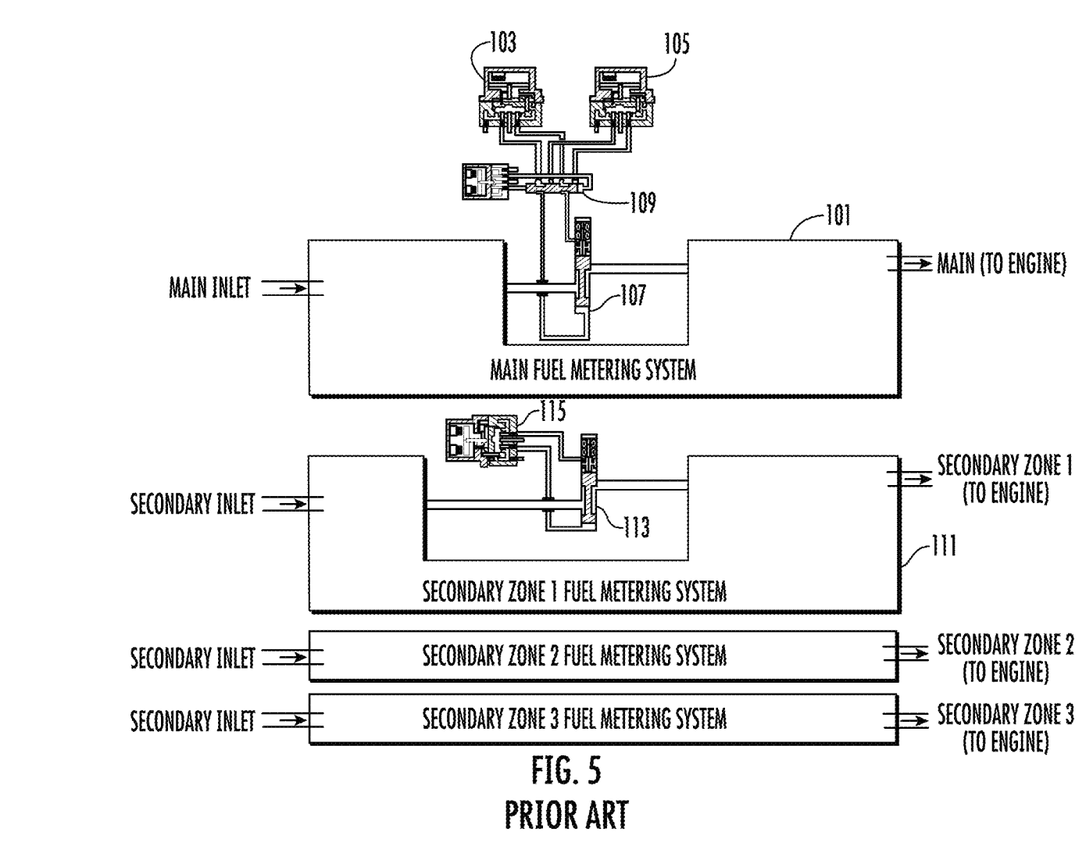
FIG. 5 is a partially detailed illustration of certain fuel metering components of the prior art fuel metering system of FIG. 1.

FIG. 5 provides a more detailed fluid schematic of this prior redundant system, illustrating details of the three EHSVs 103, 105, 115, the transfer valve 109, which is a tri-land transfer valve in the illustrated embodiment, and the FMVs 107, 113 for both the main combustor stage and one of the secondary combustor stages, respectively. It is noted that such prior system utilizes single coil EHSVs 103, 105 for the redundant control of the main FMV 107, while a dual coil EHSV 115 is used for the secondary stage FMV 113. Similar control EHSVs and FMVs for additional combustor stages could also be used as appropriate in embodiments that include multiple additional stages, e.g. two additional stages are shown in FIG. 5.

As will be apparent from the foregoing, the provision of the redundant EHSVs 103, 105 to maintain operation and control of the critical main combustor stage FMV 107 in the event of failure of the controlling EHSV 103 results in the use of three EHSVs 103, 105, 115 to control two combustor stages. Unfortunately, such redundancy for the main combustor stage comes at the expense of added weight and cost. For embodiments deployed on aircraft, such additional weight brings its own additional cost besides the componentry cost due to increased fuel burn.

What is needed is a fuel control system for multi-stage combustors that provides redundant FMV EHSVs to ensure prime reliability of the main combustor metering system, but that does not add undesirable cost, weight, size, and complexity to the engine. Embodiments of the present invention provide such a system that eliminates the dedicated redundant EHSV, and hardware related to the connectors, harness, and EEC are minimized. These and other advantages of the invention, as well as additional inventive features, will be apparent from the description of the invention provided herein.

BRIEF SUMMARY OF THE INVENTION

In view of the above, embodiments of the present invention provide a new and improved fuel control system for multi-stage gas turbine engines. More particularly, embodiments of the present invention provide a new and improved fuel control system for multi-stage gas turbine engines that provides redundant fuel metering control for at least one critical combustor. Still more particularly, embodiments of the present invention provide such redundant control by FMV EHSVs utilized during non-failure operation to control fuel metering to separate stages to ensure prime reliability of the main combustor metering system. Such embodiments do not add undesirable cost, weight, size, and/or complexity to the system. Embodiments of the present invention provide such a system while eliminating the dedicated redundant EHSV for the primary combustor stage, and hardware related to the connectors, harness, and EEC are also minimized.

In one embodiment the system utilizes only two total dual channel servo valves to provide normal, non-fault operation of a primary and a secondary combustor stage, and to provide redundant, failsafe operation of the primary combustor stage during a failure of one of the dual channel servo valves that controls fuel metering to the primary combustor stage. In one embodiment a multi-land transfer valve is utilized to transfer fuel metering control from the failed dual channel servo valve of the primary combustor stage to the working dual channel servo valve of the secondary combustor stage. In such preferred embodiment, the multi-land transfer valve also drives the FMV of the secondary combustor stage to a failsafe mode of operation. In an embodiment, the multi-land transfer valve may be a quad-land transfer valve.

Such embodiments reduce space claim/weight of the overall fuel metering system and increase the mean time between failures (MTBF) with a reduction of electrical components. In one embodiment, the servo valves are standardized dual coil servo valves.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 3:
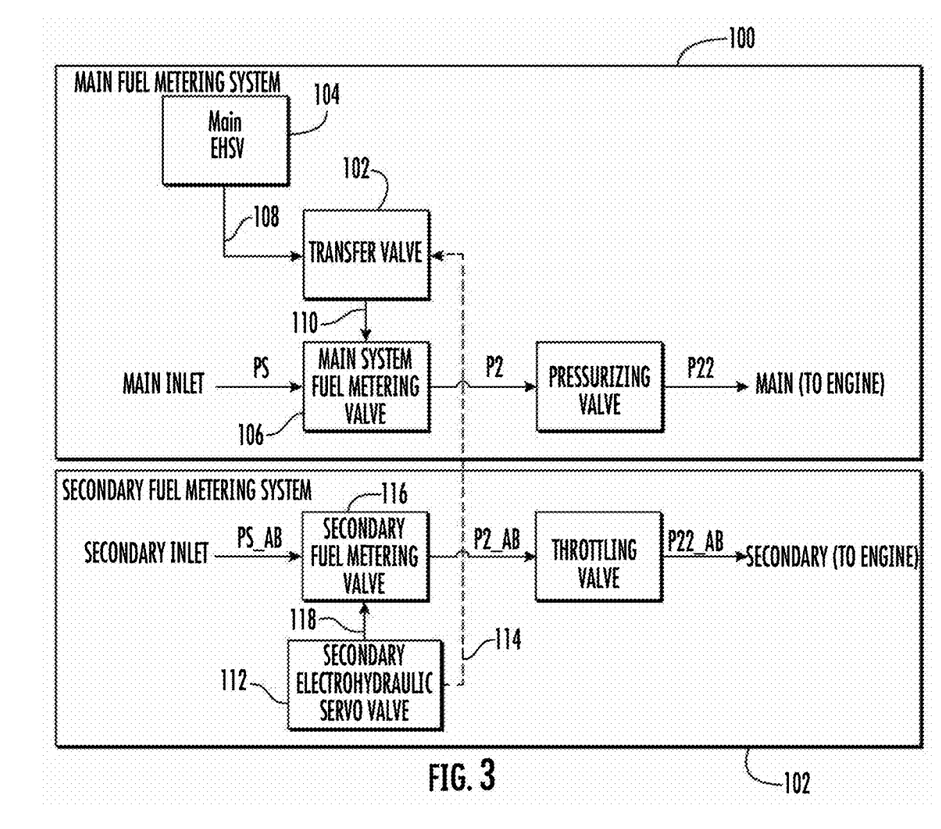
FIG. 3 is a simplified block diagram of an embodiment of a fuel metering system for a multi-stage combustor having redundant fuel metering control for the primary stage combustor constructed in accordance with the teachings of the present invention illustrating normal, non-fault operation.
Figure 4:
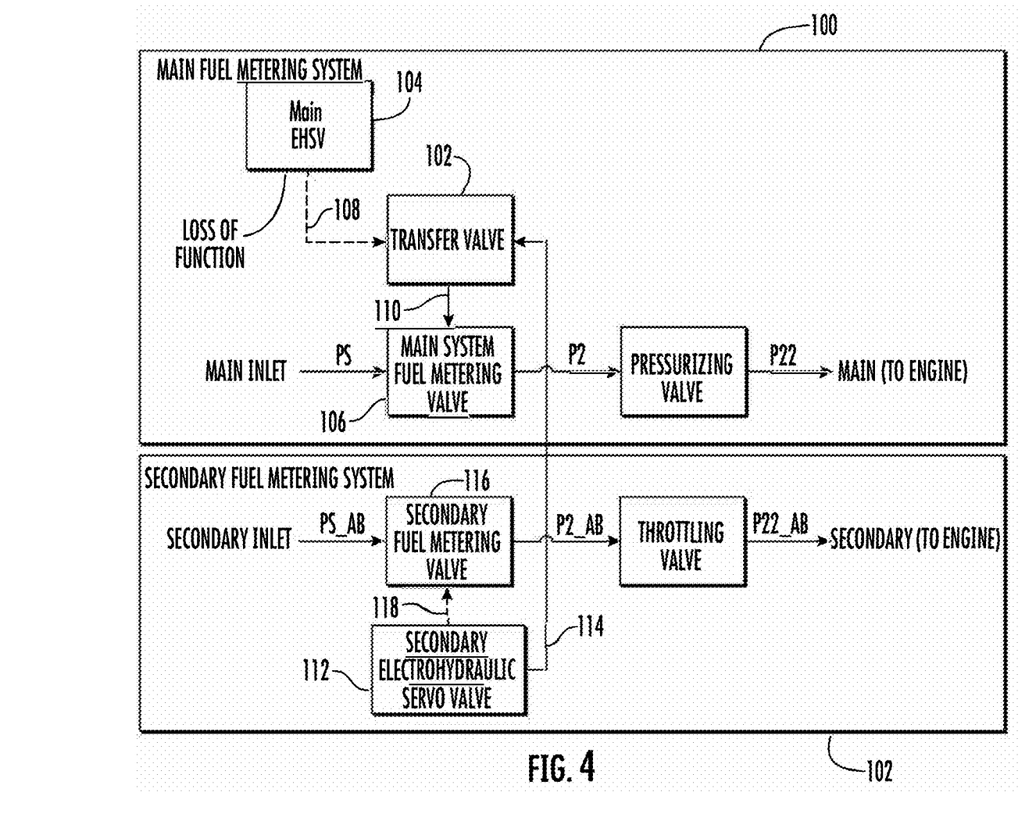
FIG. 4 is a simplified block diagram of the fuel metering system for the multi-stage combustor having redundant fuel metering control for the primary stage combustor of FIG. 3 illustrating redundant fuel metering operation of the primary stage combustor during a failure of the primary FMV control.
Figure 6:
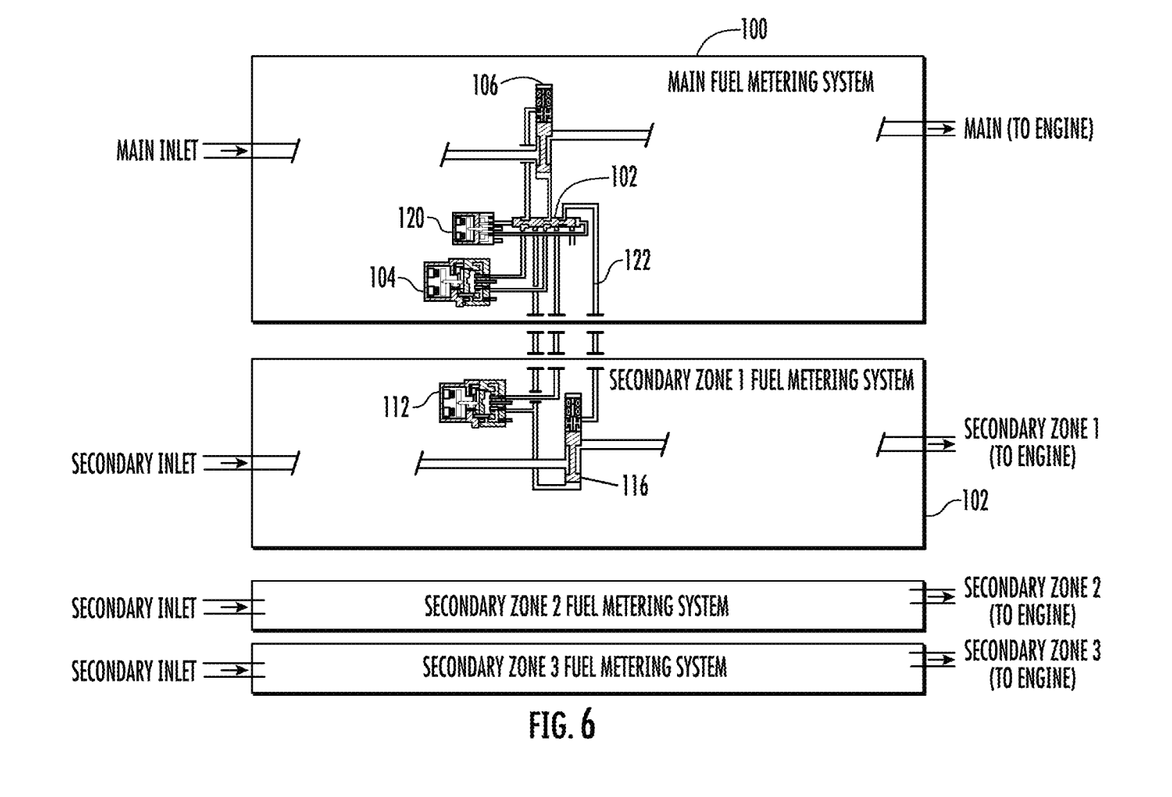
FIG. 6 is a partially detailed illustration of certain fuel metering components of the embodiment of the fuel metering system of FIG. 3 constructed in accordance with the teachings of the present invention.

Turning now to the drawings, and particularly to FIGS. 3, 4, and 6, there is illustrated an embodiment of the fuel control system for a multi-stage combustor system that provides redundant fuel metering control for a primary combustor stage by utilizing a control valve from a secondary combustor stage. In the illustrated embodiment and as will be discussed more fully below, a multi-land transfer valve is used to switch control of the fuel metering valve from the failed servo valve to a working servo valve of a secondary, less critical, stage combustor. This transfer valve also drives the fuel metering valve for the secondary, less critical, stage combustor to a failsafe position. It should be noted, however, that the present invention is not limited only to the embodiment illustrated, and that such embodiment should be taken by way of example and not by way of limitation.

FIG. 3 illustrates one embodiment of the present invention having a main fuel metering system 100 and at least one secondary, e.g., afterburner, fuel metering system 102, each operating in a normal operating mode. The transfer valve 102 is positioned such that the control pressures from the main EHSV 104 are supplied to position the main FMV 106 as illustrated by the solid line 108, 110. The control pressures from the EHSV 112 of the secondary stage combustor fuels metering system 102, or the designated zone of the secondary zone as described in the '658 Patent discussed above and incorporated by reference thereto, are blocked from the main FMV 106 at the transfer valve 102, illustrated by the dashed line 114. During this normal operation, the designated zone of the secondary fuel system is available and fuel flow thereto is metered by the secondary zone FMV 116 as commanded by the EEC via the secondary zone EHSV 112, illustrated by the solid line 118.

FIG. 4 illustrates the embodiment of FIG. 3 in its backup operating mode that provides redundant FMV 106 control during a failure of the main EHSV 104. In this mode the transfer valve 102 is positioned such that the control pressures from the EHSV 112 of the designated zone of the secondary fuel metering system are supplied to position the main FMV 106, illustrated by the solid line 114, 110. The control pressures from the main EHSV 104 are blocked from the main FMV 106 at the transfer valve 102, illustrated by the dashed line 108. In this position the transfer valve 102 provides a hydraulic signal (discussed more fully below with reference to FIG. 6) that drives the secondary zone FMV 116 to its failsafe, e.g., shutoff position.

FIG. 6 shows a more detailed fuel flow schematic of the embodiment of FIG. 3 positioned and operating in its normal operating mode. The transfer system, including a transfer EHSV 120 driving a multi-land transfer valve 102, is positioned such that the control pressures from the main EHSV 104 are supplied to position the main FMV 106. While this FIG. 3 illustrates a multi-land piston for the transfer valve 102, additional lands may be added to add additional functionality as will be recognized by those skilled in the art from the foregoing. The control pressures from EHSV 112 of the designated zone of the secondary fuel system are blocked from the main FMV 106 at the transfer valve 102. During this normal operation, the designated zone of the secondary fuel system is available and fuel flow thereto is metered by the secondary zone FMV 116 as commanded by the EEC via the secondary EHSV 112.

If the main EHSV 104 fails, the transfer EHSV 120 moves the piston of the transfer valve 102 such that the control pressures from the EHSV 112 of the designated zone of the secondary fuel system are now supplied to position the main FMV 106. The control pressures from the main EHSV 104 are blocked from the main FMV 106 by the lands of the transfer valve 102. In this position the transfer valve 102 provides a hydraulic signal at pressure Ps that drives the secondary zone FMV 116 to its failsafe, e.g., shutoff position via line 122.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel metering system for a multi-stage combustion system having a main combustion stage and at least one secondary combustion stage, comprising:
    a main fuel metering system configured to supply fuel to the main combustion stage, the main fuel metering system having a main electro-hydraulic servo valve (EHSV) fluidly coupled to a main system fuel metering valve (FMV) through a transfer valve; and
    a secondary fuel metering system configured to supply fuel to the secondary combustion stage, the secondary fuel metering system having a secondary electro-hydraulic servo valve (EHSV) fluidly coupled to a secondary fuel metering valve (FMV) and to the main system fuel metering valve (FMV) through the transfer valve; and
    wherein the transfer valve includes a multi-land piston configured to provide control pressures from the main EHSV to the main FMV to control positioning thereof during a normal mode of operation, and to provide control pressures from the secondary EHSV to the main FMV to control positioning thereof during a backup mode of operation.

2. The system of claim 1, wherein the transfer valve is further configured to provide a hydraulic control signal to the secondary FMV to drive it to a failsafe position during the backup mode of operation.

3. The system of claim 1, wherein the multi-land piston of the transfer valve is at least a quad-land piston.

4. The system of claim 1, wherein the transfer valve is configured to block control pressures from the secondary EHSV to the main FMV during a normal mode of operation, and to block control pressures from the main EHSV to the main FMV during a backup mode of operation.

5. The system of claim 1, wherein multi-land piston of the transfer valve is positioned by a transfer EHSV.

6. The system of claim 5, wherein the transfer EHSV is a dual coil EHSV.

7. The system of claim 1, wherein the main EHSV and the secondary EHSV are each dual coil EHSVs.

8. A fuel metering system for a combustion system having a first combustor and a second combustor, comprising:
    a first fuel metering system configured to supply fuel to the first combustor, the first fuel metering system having a first electro-hydraulic servo valve (EHSV) fluidly coupled to a first system fuel metering valve (FMV) through a transfer system; and
    a second fuel metering system configured to supply fuel to the second combustor, the second fuel metering system having a second electro-hydraulic servo valve (EHSV) fluidly coupled to a second fuel metering valve (FMV) and to the first fuel metering valve (FMV) through the transfer system; and
    wherein the transfer system includes a fuel transfer valve having a multi-land piston configured to provide control pressures from the first EHSV to the first FMV to control positioning thereof during a normal mode of operation, and to provide control pressures from the second EHSV to the first FMV to control positioning thereof during a backup mode of operation.

9. The system of claim 8, wherein the transfer valve is further configured to provide a hydraulic control signal to the second FMV to drive it to a failsafe position during the backup mode of operation.

10. The system of claim 8, wherein the multi-land piston of the transfer valve is at least a quad-land piston.

11. The system of claim 8, wherein the transfer valve is configured to block control pressures from the second EHSV to the first FMV during a normal mode of operation, and to block control pressures from the first EHSV to the first FMV during a backup mode of operation.

12. The system of claim 8, wherein multi-land piston of the transfer valve is positioned by a transfer EHSV.

13. The system of claim 12, wherein the transfer EHSV is a dual coil EHSV.

14. The system of claim 8, wherein the first EHSV and the second EHSV are each dual coil EHSVs.

15. A method of metering fuel for a multi-stage combustion system having a main combustion stage and at least one secondary combustion stage, comprising the steps of:

controlling a position of a main system fuel metering valve (FMV) via a main electro-hydraulic servo valve (EHSV) during a normal mode of operation;

controlling a position of a secondary system fuel metering valve (FMV) via a secondary electro-hydraulic servo valve (EHSV) during the normal mode of operation; and controlling a position of the main system fuel metering valve (FMV) via the secondary electro-hydraulic servo valve (EHSV) during a backup mode of operation.

16. The method of claim 15, further comprising the step of driving the secondary system fuel metering valve (FMV) to a failsafe position during the backup mode of operation.

17. The method of claim 15, further comprising the step of blocking the main EHSV from controlling the position of the main FMV during the backup mode of operation.

18. The method of claim 15, further comprising the step of blocking the secondary EHSV from controlling the position of the secondary FMV during the backup mode of operation.

* * * * *